United States Patent [19]

Ferrero

[11] Patent Number: 4,936,545
[45] Date of Patent: Jun. 26, 1990

[54] BALL VALVE FOR REFRIGERATING SYSTEMS

[76] Inventor: Riccardo Ferrero, Via Dogliani 84, 12060 Farigliano/Cuneo, Italy

[21] Appl. No.: 370,400

[22] Filed: Jun. 22, 1989

[30] Foreign Application Priority Data

Apr. 5, 1989 [IT] Italy ................................ 67237 A/89

[51] Int. Cl.⁵ .............................................. F16K 5/08
[52] U.S. Cl. ..................................... 251/288; 251/315
[58] Field of Search ...................... 251/286, 288, 315; 137/315

[56] References Cited

U.S. PATENT DOCUMENTS 1,906,266  5/1933  Hoffman ............................. 251/286
3,226,082 12/1965  Gulick et al. .................... 251/315 X
3,380,472  4/1968  Leighton .......................... 251/288 X
3,385,313  5/1968  Olada ............................. 251/715 X
3,591,134  7/1971  Fujiwara ......................... 251/288 X Primary Examiner—John C. Fox
Attorney, Agent, or Firm—James D. Hall

[57] ABSTRACT

Improved ball valve for refrigerating systems, formed by a valve body and an inlet duct and an outlet duct. The other component parts such as a ball shutter, a circular flange, a closure member, an actuating means and sealing means are all mounted by introducing them from the above.

In this ball valve the operations of replacing the components are very much simplified, rapid and economical.

8 Claims, 4 Drawing Sheets

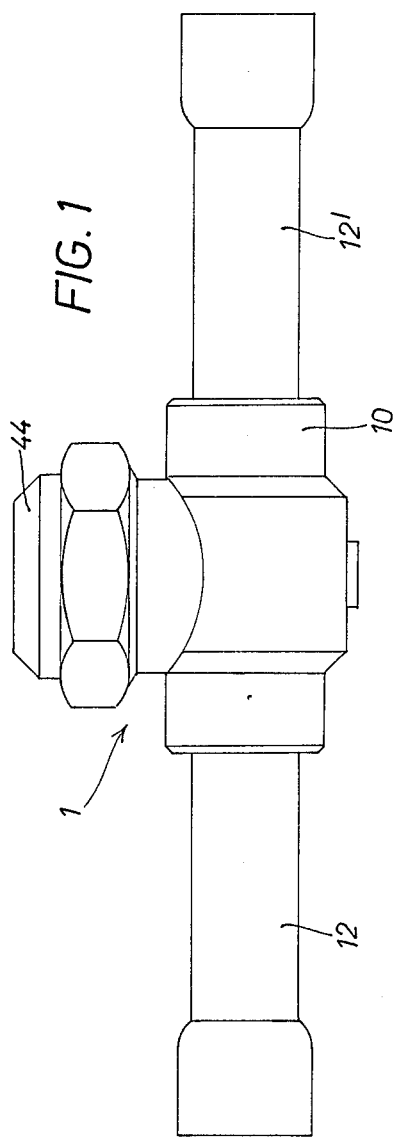
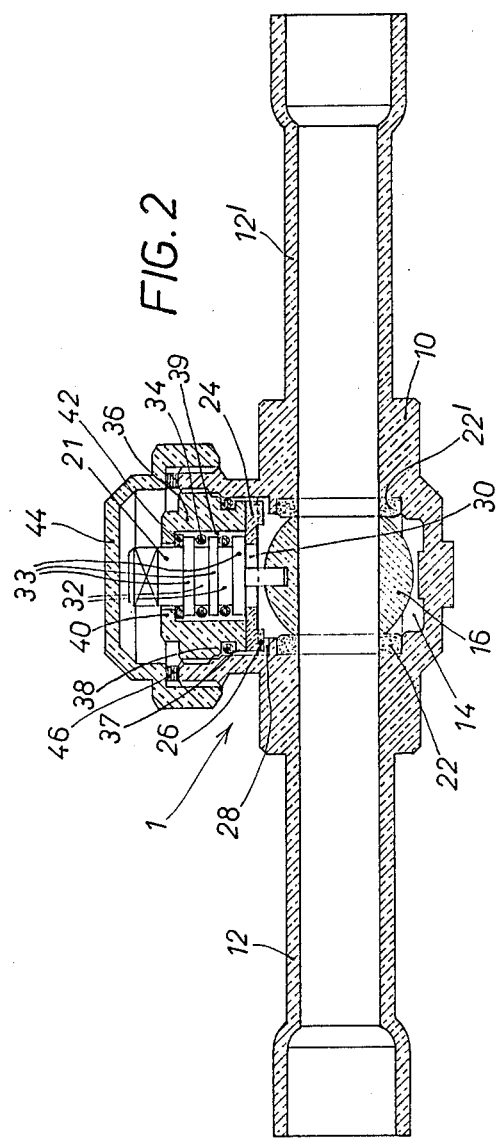

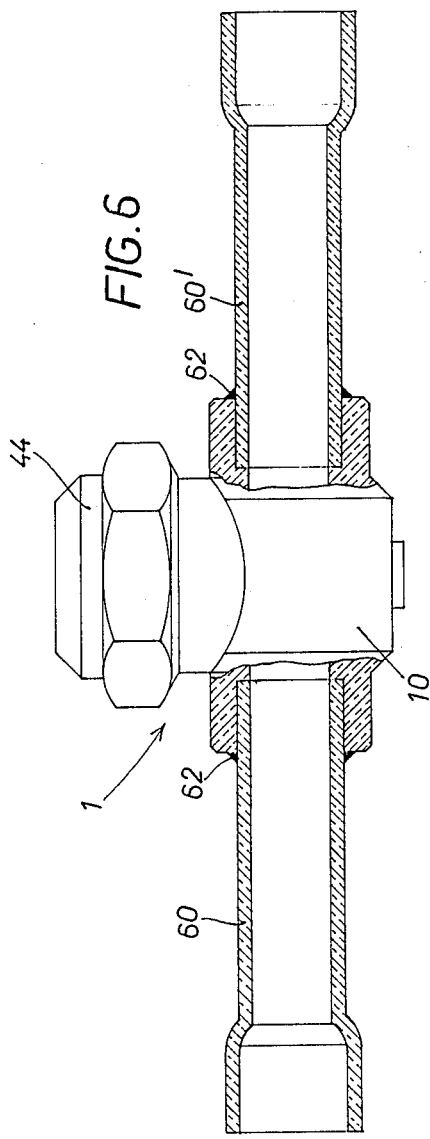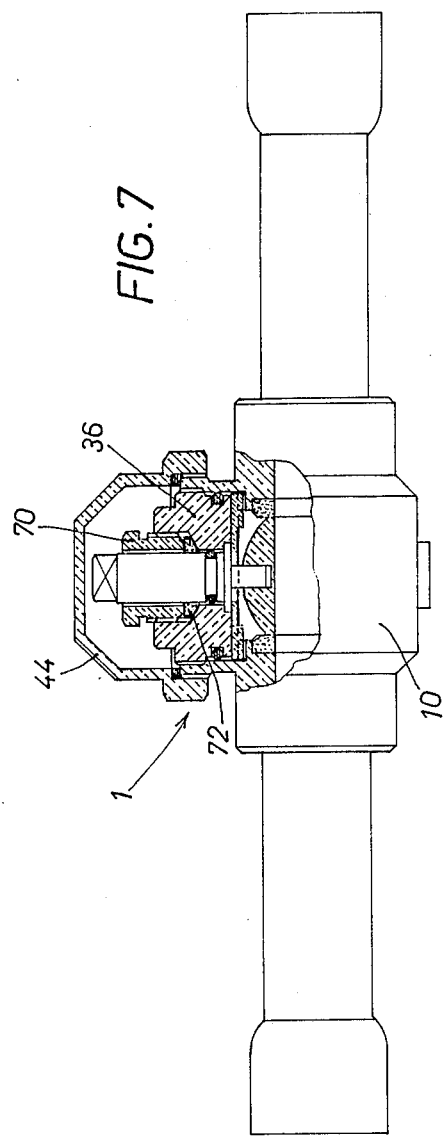

BALL VALVE FOR REFRIGERATING SYSTEMS

BACKGROUND OF THE INVENTION

This invention relates to an improved ball valve for refrigerating systems, in particular refrigerating systems using Freon gas.

It is known to use ball valves for intercepting or regulating a gas flow in refrigerating systems for interrupting the gas flow when a breakdown occurs in the refrigerating system.

Normally such ball valves are connected with their inlet and outlet openings to the pipes in which the gas flow forming the refrigerating circuit is running.

The connection between the ball valve and the cooling circuit is obtained substantially by inserting in unthreaded pipe fittings provided at the ends of the ball valve, the pipes of the refrigerating circuit and subsequently locking them in the interior of the pipe fittings by a brazing welding operation.

At present the ball valves used in refrigerating systems are normally constituted by a body of appropriate form designed to contain the inner members of the valve including a ball shutter, sealing seats and gaskets.

These latter members are normally mounted by introducing them through side inlet and outlet openings of the gas flow, arranged along the horizontal axis of the valve. However, these members could not be inserted through the vertical aperture forming the seat of the actuating members as this aperture is too small.

After mounting the above-mentioned members, they are enclosed in the interior of the valve body through an apertured sleeve screwed onto a side end of the valve body.

For greater safety of sealing between the sleeve and the valve body, a circular weld is made along the connection strip therebetween for irremovably locking the above-mentioned members.

These welds between the pipes and the side connections as well as between the sleeve and the valve body have the disadvantage of considerably heating the valve body even if special expedients are adopted for cooling it.

This heating sometimes causes a deterioration of the sealing seats made of synthetic plastic material and arranged in the interior of the valve with the result that it is necessary to replace the latter which has been made unusable and unreclaimable as it is impossible to get access to the interior thereof for replacement of the members damaged by heat.

It is an object of the present invention to eliminate or reduce the drawbacks and disadvantages of the ball valves hirtherto used in refrigerating systems and to provide a ball valve structure that is decidedly more simple than the known types and moreover does not involve the risk of deterioration of the inner members of the valve during the operation of connection to the pipes of the cooling circuit.

A further object to be achieved by the present invention consists in providing a ball valve in which mounting and dismounting of the elements contained in the interior of the valve body can be carried out with great ease and speed without using special equipment.

SUMMARY OF THE INVENTION

The above and other objects and advantages of the invention, which will become apparent from the following description, are achieved by an improved ball valve for refrigerating systems, comprising a valve body having an inlet duct and an outlet duct, a ball shutter accommodated within the valve body, sealing means accommodated in the interior of the valve body and actuating means for the ball shutter. The improvement afforded by the present invention consists in that the valve body is made with an upper aperture larger than the diameter of the ball shutter and the valve body is provided with a closure member to permit the inner members of the valve to be mounted from above, and with a circular member engaging the valve body to limit the rotation of the shutter to 90° and, further, to constitute a supporting member for the actuating means.

BRIEF DESCRIPTION OF THE DRAWINGS

FIG. 1 is a side view of an improved ball valve according to the invention;

FIG. 2 is a side view in part axial section of the improved ball valve of FIG. 1;

FIG. 6 is a side view in part axial section of another embodiment of the improved ball valve according to the invention;

FIG. 7 is a side view in part axial section of a further embodiment of the improved ball valve according to the invention;

DESCRIPTION OF PREFERRED EMBODIMENTS

Figures 3, 4, 5:
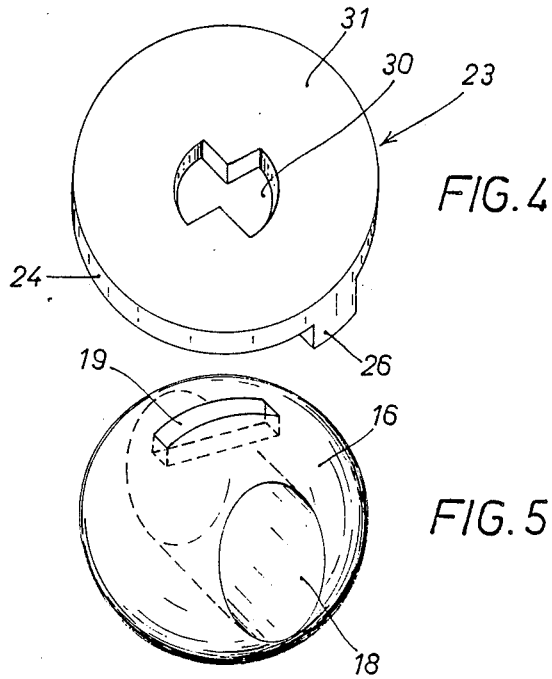
FIG. 3 is a perspective view of a component part of the improved ball valve of FIG. 1.
FIG. 4 is a perspective view of another component part of the improved ball valve of FIG. 1.
FIG. 5 is a perspective view of a further component part of the improved ball valve of FIG. 1.

Referring to FIGS. 1 and 2, an improved ball valve for refrigerating systems according to the invention, indicated generally by 1 in the drawings, is formed by a valve body 10 of metallic material such as, for example, bronze, brass, light alloy, etc. and by a pair of side ducts 12 and 12' which for a certain length extend axially from the body 10 and form the connection members for the pipes of the refrigerating system.

The inlet duct 12 and outlet duct 12' normally are of circular cross section and are formed integrally with the body 10 by hot-pressing operations.

Subsequently, the inner passage of the ducts 12, 12' and a recess 14 designed to contain the members of the valve are obtained by appropriate mechanical operations not disclosed in the present description as they are known to those skilled in the art.

Thus, the recess 14 is designed to accommodate a ball shutter 16 shown on an enlarged scale in FIG. 5 and having a through hole 18 for the passage of the cooling fluid and an upper groove 19 adapted to be coupled to an actuating means 20 shown on an enlarged scale in FIG. 3 and described in detail hereinafter, and two interposed sealing gaskets 22, 22' each formed by a ring of Teflon or other suitable material ensuring sealing of the ball valve.

Arranged above the ball shutter 16 is a circular member 23 formed by a circular flange 24 shown on an enlarged scale in FIG. 4 and having a pair of diametrically opposed lugs 26 projecting from the lower surface thereof to engage corresponding grooved seats 28 arranged in the valve body 10 to prevent rotation of the flange during actuation of the actuating means 20.

Further, the circular flange 24 has a central hole 30 which is appropriately shaped to limit to 90° the rotation permitted thereby.

Obviously, within the arc of 90° the ball shutter 16 may assume an infinity of positions, thus permitting the best possible regulation of the gas or fluid passing through the valve 1.

The actuating means 20 is formed by a cylindrical stem 21 having along its peripheral surface alternate circular projections and recesses forming rings 33 and circular grooves 32, respectively, so as to form seats for gaskets 34 commonly known as "O-rings" or simply "O-R's" for sealing the internal pressure of the valve. The upper portion 50 of the stem 21, FIG. 3, is appropriately restricted and adapted to be coupled to an actuating lever while the lower portion 52 is shaped in the form of a flat key adapted to be inserted in the groove 19 of the ball shutter 16.

The perpendicular position of the actuating stem 21 relative to a horizontal axis passing through the hole 18 in the ball shutter 16 is obtained by the support of one of the rings 33 of the stem 21 on an upper surface 31, in FIG. 4, of the circular flange 24 arranged horizontally, too.

A screw type closure member 36 of cylindrical shape and of a diameter greater than the diameter of the ball shutter 16 has an outer thread adapted to engage a corresponding thread arranged in the lower portion of the valve body 10. The closure element 36, after its complete insertion, adheres with its lower surface to the upper surface of the circular flange 24 to lock the latter in the grooved seats 28 described previously.

Further, the closure element 36 outwardly has a circular groove 37 forming the seat of an "O-R" 38 and inwardly has a cylindrical seat 39 in which the stem 21 is arranged with an associated gaskets "O-R" 34.

A reduction of the diameter of the seat 39 provides a shoulder 40 adapted to prevent the stem 21 from being extracted from the interior of the seat 39 in the closure member 36.

A gasket 42 interposed between shoulder 40 and stem 21 ensures the upper sealing of the closure member 36.

An inwardly threaded cover 44 is screwed onto the upper portion of the body 10 and forms the upper closure of the valve whereas sealing is obtained by the interposition of a gasket 46 between cover 44 and valve body 10.

FIG. 6 shows a further embodiment of the invention limited only to the inlet and outlet ducts of the valve and indicated in FIG. 6 by the numerals 60 and 60', which ducts, instead of being formed integrally with the valve body 10, are connected thereto by a circular weld indicated by the numeral 62.

FIG. 7 shows another embodiment which may be considered a modification of the one shown in FIG. 2.

The closure member 36 in FIG. 7, instead of having in its upper portion a shoulder 40, has along the entire cylindrical seat 39 a thread adapted to engage a stuffing box 70 having a hexagonal head and which, at the end of its insertion, is stopped by urging against a gasket 72, thus providing an adjustable upper sealing for the valve body 10.

Figure 8:
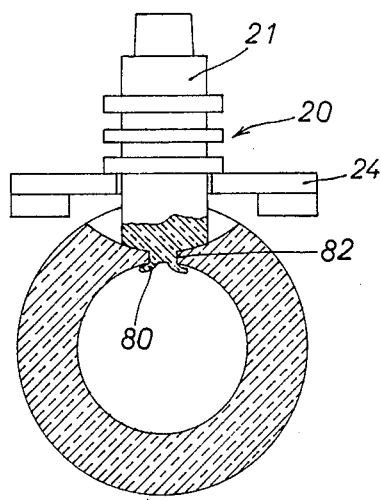
FIG. 8 is a side view of the members shown in FIGS. 3, 4 and 5, partly in section and connected to one another in a modification of the improved ball valve according to the invention.

FIG. 8 shows a further modification of the improved ball valve according to the invention which differs with regard to the actuating stem 21 which has a pin 80 projecting from its lower portion 52 and inserted in a through hole 82 provided in the center of the groove 19 in the ball shutter 16.

After insertion in the hole 82, the pin 80 is calked so as to provide a very solid connection between these two members and the circular flange 24 inserted between these two members before calking.

Figure 9:
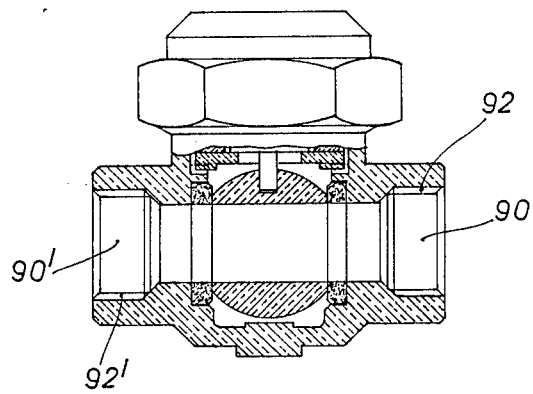
FIG. 9 is a side view in part axial section of the improved ball valve according to another modification of the ball valve according to the invention.

FIG. 9 illustrates yet another possible modification to the embodiment shown in FIG. 2, this modification being limited to the seats of connection only (indicated in FIG. 9 by the numerals 90 and 90') of the valve body 10, each of which seats has a thread indicated by 92 and 92' and adapted to engage in side ducts similar to those indicated previously by the numerals 12 and 12', or in other types of connections known to those skilled in the art.

Mounting of the valve in a refrigerating circuit is effected by inserting in the thickened portions of the ducts 12 and 12' the pipes coming from the cooling system and then welding them by brazing or electric TIG welding or connecting them by other known means.

It is thus evident that according to the invention an improved ball valve for refrigerating systems has been provided which is devoid of the disadvantages encountered in the known ball valves and due to deterioration of the inner gaskets of the valve by the excessive heat that accumulates in the valve body during the welding operations.

A further advantage of the present invention consists in the extreme ease and speed of replacement of the sealing members as the same can all be extracted from the upper part of the valve body without having to resort to its disconnection from the cooling circuit by an operation of detachment from the system as is done at present in the known valves.

Although some preferred embodiments of the improved ball valve have thus been described, the latter is not limited to the examples given above and any other form or dimension comes within the scope of the same inventive idea as defined by the accompanying claims.

I claim:

1. An improved ball valve for refrigerating systems, comprising a valve body having an inlet duct and an outlet duct, a ball shutter accommodated within said valve body, actuating means for rotating said ball shutter, said valve body having an upper aperture of greater dimensions than the diameter of said ball shutter to permit said ball shutter to be mounted from above, a circular member engaging said valve body and adapted to limit rotation of said actuating means and ball shutter to 90° and forming a supporting member for said actuating means, a closure member engaging said valve body over said actuating means to urge the actuating means against said circular member.

2. An improved ball valve for refrigerating systems, comprising a valve body having an inlet duct and an outlet duct, a ball shutter accommodated within said valve body, actuating means for rotating said ball shutter, said actuating means including a stem having a flattened side, a closure member surrounding said actuating means and engaging the interior of said valve body to prevent movement of the actuating means away from the ball shutter, a circular member arranged between said ball shutter and said closure member to limit the rotation of said ball shutter to 90°, said circular member engaging said valve body to prevent rotation of the circular member relative to the valve body and being provided with an appropriately shaped central hole having spaced stops, said circular member central hole receiving said actuating means stem for angular movement of its said flattened side therein between said stops.

3. An improved ball valve as claimed in claim 2, wherein said closure member is centrally provided with a cylindrical seat carrying said stem adapted to actuate said ball shutter.

4. An improved ball valve as claimed in claim 3, wherein a shoulder is provided at the upper end of said cylindrical seat to form means for preventing said actuating means from being extracted from said cylindrical seat.

5. An improved ball valve as claimed in claim 4, wherein said actuating means is formed by said stem having along its peripheral surface alternately a plurality of grooves and rings.

6. An improved ball valve as claimed in claim 2, wherein said circular member forms a supporting base for said actuating means so as to define a perpendicular position between these members.

7. An improved ball valve as claimed in claim 2, wherein said circular member is formed by a circular flange provided with two diametrically opposed peripheral lugs projecting from the lower surface of said flange and engaging corresponding groove seats provided in the upper portion of said valve body.

8. An improved ball valve as claimed in claim 2, wherein a pin projects from one end of said actuating means and is inserted in a thru hole arranged vertically in said ball shutter and is caulked at one end thereof to provide a firm connection between said actuating means and said ball shutter.

* * * * *